Figure 1:
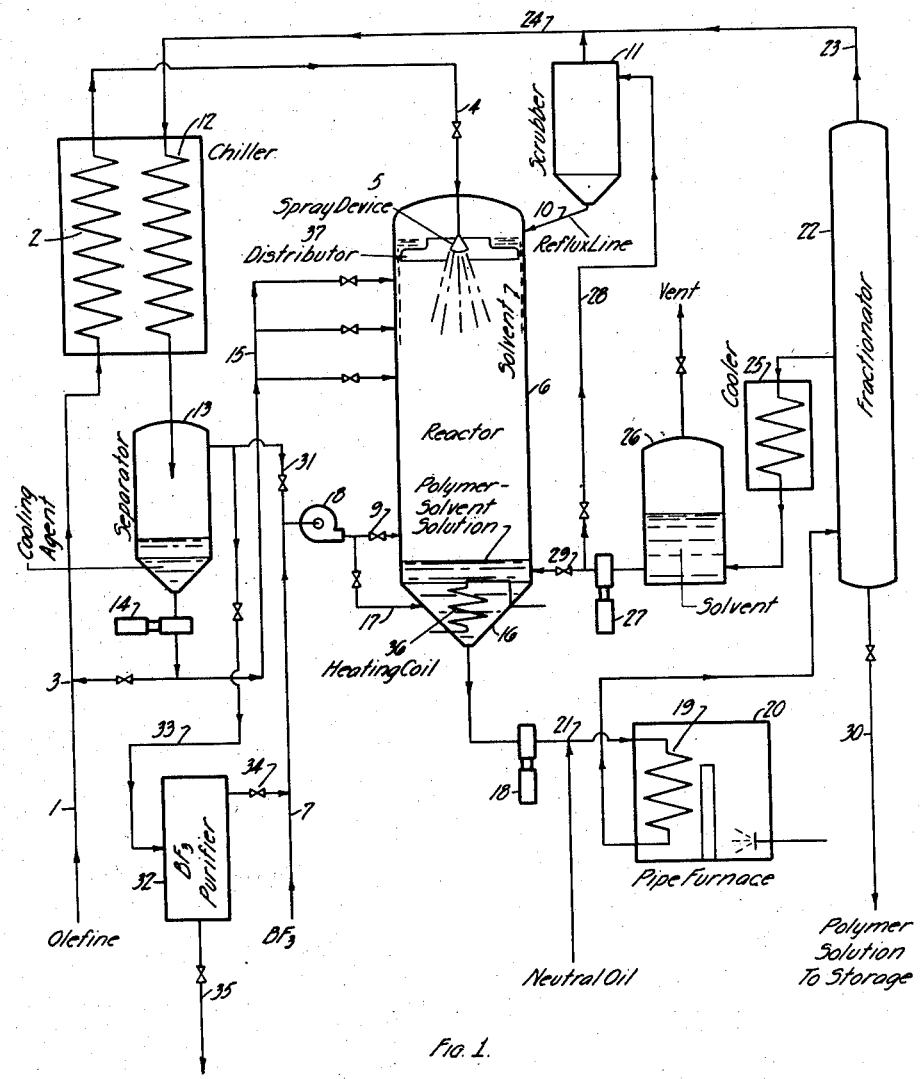

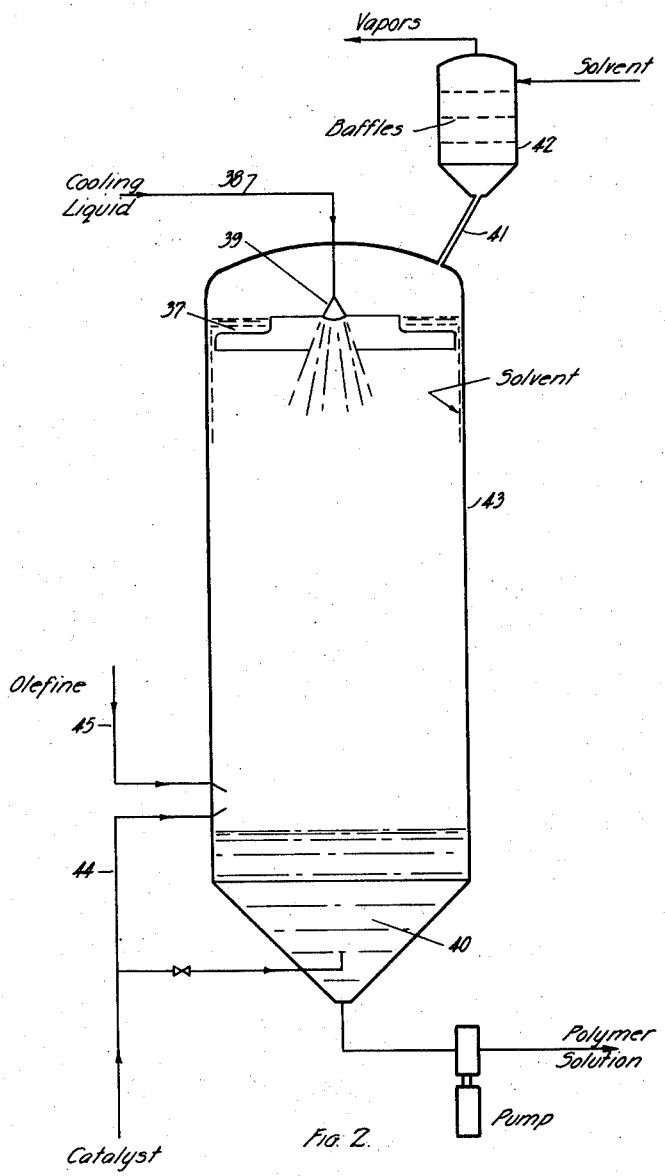

Patented June 29, 1937

2,085,524

UNITED STATES PATENT OFFICE 2,085,524

POLYMERIZATION OF OLEFINES

Martin de Simó and Frederick B. Hilmer, Berkeley, Calif., assignors to Shell Development Company, San Francisco, Calif., a corporation of Delaware

REISSUED

Application July 12, 1935, Serial No. 31,075

5 Claims. (Cl. 260—2)

Our invention relates to the polymerization of olefines under the catalytic action of polymerizing catalysts particularly those of the type of boron fluoride, such as aluminum chloride, zinc chloride, etc. In particular it is concerned with the polymerization of propylene and/or beta-iso-olefines, under the influence of a gaseous polymerization catalyst of the type of boron fluoride, which may include hydrogen fluoride, said beta-iso-olefines having less than 9 carbon atoms per molecule and having the general formula

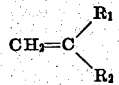

wherein $R_1$ and $R_2$ represent alkyl radicals and of which iso-butylene

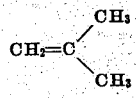

is the first member.

The catalysts which we intend to use in our process may be termed low temperature catalysts. They include all those which promote polymerization of olefines materially at or below atmospheric temperature. Thus in this class are contained boron fluoride, hydrogen fluoride, aluminum chloride, zinc chloride and iron chloride. Excluded are such catalysts as sulfuric acid, phosphoric acid, oxygen, cyanides, etc.

The gaseous catalysts boron fluoride and hydrogen fluoride or mixtures thereof are particularly useful, because they not only produce certain types of highly valuable polymers, but they lend themselves exceptionally well to continuous methods of polymerization.

It is one object of our process to provide means for accurately controlling the temperature of reaction, the temperature control being one of the prime factors in obtaining uniform products, and it is another object to provide a continuous method for manufacturing polymers.

The polymers which we produce may vary in appearance from highly viscous liquids to rubberlike materials, depending upon the specific conditions under which they are manufactured. They are soluble or dispersable in hydrocarbon oils and can be used for plasticizers or constituents of lacquers or lubricating oils, etc.

It has been the practice heretofore to carry out the polymerization of olefines with suitable catalysts by bringing the catalyst in contact with the liquid reactant. The olefines were preferably kept in solutions of an inert diluent, to prevent undue thickening of the product of the reaction, which might prevent the polymerization from going to substantial completion.

During the polymerization considerable heat develops. It has been recognized in the past, that it is essential to keep the temperature throughout the reacting mass within certain limits. For instance, in the case of polymerizing iso-butylene by means of boron fluoride the temperature should be kept below $-10°$ C., and it has been suggested to add solid carbon dioxide to the reacting mass to maintain an evenly low temperature.

We have found, however, that very often cooling with solid carbon dioxide or external cooling is insufficient and does not lead to the formation of polymers of molecular sizes sufficiently large for many purposes. Solid carbon dioxide is not soluble in the reaction mass, and its effect is that of cooling parts of the mixture to temperatures as low as $-80°$ C., and allowing at the same time the temperature in other parts to rise to above $-10°$ C. at any one moment of the polymerization. The result is an uneven polymerization.

Our invention comprises improved methods of cooling, which depend for their successful execution on the immediate and even removal of the heat of polymerization and the maintenance of a desired reaction temperature with narrow limits. One such method consists of mixing with the olefines or a solution thereof a cooling liquid miscible therewith and having a boiling temperature not exceeding that of the desired reaction temperature under prevailing pressures. As the polymerization takes place and the heat of reaction is developed, at least part of the cooling liquid evaporates, thereby absorbing heat. Because of the complete miscibility of the cooling liquid and the olefines, cooling is not only distributed evenly but also is effective immediately. There is no delay or rise of temperature involved, during which formation of relatively small and undesirable polymers can take place. We prefer to use the cooling liquid, whose temperature under the conditions of reaction corresponds substantially to the desired reaction temperature. This permits the use of any quantity of cooling liquid in excess of the minimum required to hold the temperature at the proper level, without involving the risk of cooling to too low a temperature, which might unnecessarily retard the reaction and result in undesirable products.

When polymerizing propylene and beta-iso-olefines in contact with a catalyst of the type of boron fluoride, we have found that extremely large polymers are formed if the polymerization temperature is kept within the range of —20° C. to —80° C. the exact optimum temperature depending upon various factors involved in the polymerization. It must be understood, however, that in order to obtain a uniform product, the temperature during an individual run requires control within much closer limits, preferably within 10° C. In our preferred procedure we mix the olefines, or a solution thereof with an inert liquid whose average boiling temperature lies somewhere between —100° C. and —20° C., and whose boiling range is preferably not more than about 25° C. It shall be understood, however, that in some cases liquids may be used of a wider boiling range, such as natural gasoline, or bottled gas, which may possess boiling ranges as high as 200° C. but which are sufficiently volatile, so that substantial portions thereof evaporate causing the desired cooling.

Occasionally it is practical to apply pressures above or below atmospheric in the reaction zone in order to adjust the boiling point of a particularly suitable cooling liquid. For example, if it is attempted to polymerize propylene, having a normal boiling temperature of —47° C. in the liquid phase and at a temperature of about —30° C., ethane at a pressure of about 150 lbs. absolute provides a suitable refrigerant. When polymerizing iso-butylene whose normal boiling point is —8° C., or its homologues of even higher boiling points, superatmospheric pressures may be applied advantageously. Polymerizing under pressure permits the use of cooling liquids having much lower boiling points than the olefines, and large differences in boiling points between olefines and refrigerant prevent substantial losses of olefines during the vaporization of the refrigerant.

In practice the mixture of olefines and cooling liquid is preferably chilled to approximately the correct reaction temperature and is kept under sufficient pressure, to insure its being in the liquid phase. A catalyst is added or the liquid is introduced into the vessel containing a catalyst, to allow the polymerization reaction to take place. During the reaction the pressure may be regulated to maintain the desired temperature. Stirring means may be provided to keep the mass agitated for the purpose of causing quick and complete contact between catalyst and olefines.

When polymerizing in the presence of a gaseous catalyst, such as boron fluoride, the olefines may be sprayed into an atmosphere containing the catalyst, and the cooling liquid is injected into the reaction zone either separately or in solution of the olefines. The spraying method has several great advantages over the method in which a pool of reacting masses is maintained. Evaporation of the cooling liquid can proceed at a greatly increased rate and the dissipation of heat due to the greatly increased contact surface may become an additional and considerable factor in cooling. Furthermore, the amount of reagents which can be engaged in the reaction at any one time must necessarily be relatively small, and the total amount of exothermic heat liberated thereby, being small, can be comparatively easily and quickly carried off. Thus the problem of cooling and maintaining an evenly low reaction temperature is greatly facilitated, and in many cases, when the polymerization is carried out by spraying the polymerizable material in a finely divided state into an atmosphere of gaseous catalyst, the cooling by evaporation of the volatile diluent can be replaced by other cooling methods described below.

Practical tests have proven that when spraying finely divided olefines either in the liquid or gaseous form in contact with the catalyst in the absence of a self-evaporating cooling agent against a cold solid surface in the presence of a suitable solvent, or into a moving stream of a suitable cold solvent, very favorable results may be obtained, the solvent serving to keep the product of reaction in the liquid state for the purpose of removal. Concentrates of olefines containing 80% and more of active components can be polymerized without danger of incomplete polymerization, olefine concentrates containing more than 80% active components occasionally yielding products of higher molecular weights than are obtainable from dilute solutions of olefines. Cooling liquid admixed to a concentrate can be so proportioned to leave after its vaporization a reaction product containing 80% or more of polymers, and solvents to carry off the product can be added after the reaction is substantially finished.

Continuous operation of the process is facilitated by spraying, the fine division of the olefines allowing for immediate contact with the catalyst thereby shortening the time of reaction and reducing delay and induction periods.

The spraying method also permits for the polymerization of gaseous olefines in the presence of gaseous catalysts, the cooling agent, if used, being the only liquid introduced into the reaction zone.

Suitable cooling agents comprise inert liquids, whose critical conditions are well above the temperatures and pressures of the reaction zone, and whose boiling range under suitable pressures is within or slightly below the desired range of the reaction temperature. Most of them are normally gaseous and include compounds such as ethane, propane, overhead vapors from natural gasoline stabilization containing mostly ethane and propane, monochlor methane, difluor-dichlor methane, etc., and their mixtures.

The quantities of cooling agent required to maintain the proper temperature cannot be accurately specified. It is desirable to have at least enough of it present to prevent the temperature at any time during the reaction from going above the desired reaction temperature, which in the case of polymerizing iso-butylene with boron fluoride is of the order of —30° C. In any event the amount of cooling liquid should be sufficient so that the latent heat available by its vaporization is at least as great as the heat of polymerization.

In order to make the process continuous it is necessary that a suitable solvent or non-solvent carrier liquid carry away the products of polymerization from solid surfaces in or around the reaction zone. If a solvent for polymers is used, it may be incorporated into the olefines prior to polymerization, or it may take the form of a scrubbing liquid which continuously washes the surfaces touched by the polymers, or else it may form a pool into which the polymers fall. Many of the cooling agents also act as good solvents for the polymers, and an excess of cooling agent may well serve to keep the polymers in the liquid form. Hydrocarbons such as propane, pentanes, naphtha, or substituted products of the type of carbon tetrachloride, chloroform, dichlorethane, etc. are good solvents for the purpose.

Carrier liquids of no or little solvent effect on polymers, such as acetone, other lower ketones and lower mono-alcohols, glycols, certain esters, etc., can be used successfully for scrubbing purposes, provided the liquid has a wetting power towards the walls of the reaction vessel, which is greater than that of the polymers. Such carrier liquids not only permit the successful removal of polymers from the surfaces surrounding the reaction, but they enable the conveyance of polymers by means of screw conveyors and similar devices, a method of transference which is not applicable to undissolved polymers in the absence of such carrier liquids because of extreme stickiness of said polymers.

Insoluble carrier liquids can be easily separated from the polymers by evaporation, either before or after the polymers are blended with other hydrocarbon oils, such as lubricating oil.

The products of polymerization, if produced according to our invention, contain substantial amounts of components having molecular weights in excess of 10,000. These high molecular weight substances are no longer viscous sticky fluids like the lower homologous members of the group but are elastic, rubbery materials.

In Figure 1, one possible form of carrying out the process of this invention is shown which enables the continuous production of olefine polymers in contact with a gaseous catalyst by spraying liquid olefines mixed with a cooling agent into an atmosphere containing the catalyst. Figure 2 represents a variation of the process of Figure 1, in which gaseous olefines are injected into the catalyst in the presence of a spray of cooling agent.

Referring to Figure 1: Iso-butylene or any of the suitable olefines previously described is introduced into the system from a source not shown, through line 1. As it proceeds to chilled coils 2, it is mixed in a T 3 with liquid propane or other suitable cooling agent. The mixture is cooled in a chiller 2 to about −50° C., and is then released through a valve 4 and a spray nozzle 5 into a reactor 6.

Instead of a spray nozzle, which at times may have a tendency to clog, a rapidly rotating plate can be employed onto which the liquid mixture drops after being discharged from the pipe line 1. The liquid is immediately thrown off in the form of a fine spray.

Boron fluoride, or its equivalent, alone or in dilution of an inert gas, is introduced through a line 7, a blower 8 and a line 9 into the reactor 6. The reactor 6 is a tall cylindrical vessel, preferably with a cone bottom. The discharge end of the line 9 may be tangentially disposed in relation to the reactor 6, so as to impart to the boron fluoride-bearing gas in the reactor a rotating motion. The spray of iso-butylene and propane from nozzle 5 descends as a fine rain in countercurrent to the ascending boron fluoride. As the iso-butylene polymerizes, heat is developed and evaporation of propane occurs, which keeps the temperature slightly below −30° C. The height of the reaction vessel is so chosen as to permit for enough time of reaction to substantially polymerize the iso-butylene during its descent. The time of reaction depends a great deal on temperature, purity of iso-butylene and condition of boron fluoride. The presence of small quantities of hydrogen fluoride, moisture or other impurities in the boron fluoride may greatly accelerate the polymerization reaction.

Propane vapors containing boron fluoride are withdrawn from reactor 6 through a reflux line 10 at the top of the reactor. They pass through a scrubber 11 in countercurrent to a suitable solvent for polymers, such as pentanes, which descends through the reflux line and flows downward in a film on the inside wall of the reactor. Means, such as a trough or distributor 37, may be provided to distribute the film of descending pentanes over the entire wall area, which positively prevents accumulation of polymers and plugging of the reactor. Likewise the scrubber and the reflux line are continuously washed and freed from depositing polymers.

The relative position of the iso-butylene intake and reflux line is of some importance. In order to prevent the escape of a substantial portion of unreacted vaporized iso-butylene into the reflux line and scrubber, the reflux line is preferably connected to the reactor at a point considerably higher than the iso-butylene intake. By this arrangement rising iso-butylene vapors are caused to polymerize and drop before reaching the reflux line.

From the scrubber 11 propane vapors proceed to chilled coils 12 and thence to a separator 13. Propane is liquefied, separated from gases containing boron fluoride, and is pumped by a pump 14 to a T 3, in which it is mixed with fresh iso-butylene. Part or all of the propane may be diverted through line 15 and be sprayed into the reactor 6 at one or several convenient points.

A solvent, such as pentane, which flows downward on the inside wall of the reactor 6 accumulates in the cone-bottom 16 to form a pool. Iso-butylene polymers descending through the atmosphere of boron fluoride, are taken up in the pool and dissolved. At times it may be desirable to heat the liquid in the pool to accelerate the rate of dissolving polymers and to reduce the viscosity of the resulting solution. This can be achieved by means of a heating coil 36. To provide agitation and to promote further polymerization of a small portion of unreacted or only partly polymerized iso-butylene, a gas containing some boron fluoride may be blown through the solution by means of line 17. If desired all of the make-up boron fluoride may be introduced at this point, in which case, the valve in line 9 is closed. The gaseous boron fluoride rises immediately to the surface of the pool and into the gaseous space of the reactor 6.

The solution of polymers is continuously withdrawn from the reactor 6 by a pump 18, which forces it through a coil 19 in a furnace 20. A light high-grade neutral oil may be introduced into the stream of the polymer solution in a T 21, which is preferably located between the pump 18 and the coil 19. The mixture, after passage through the coil 19, is introduced into a fractionator 22, from which small amounts of propane plus some boron fluoride are taken overhead as vapors; the solvent is removed as a liquid side stream, if desired, and polymers, dissolved in the neutral oil, are withdrawn as a bottom stream. The vapors from the fractionator passing through a conduit 23, join the vapors from the scrubber 11 at a point 24, and flow together to the chilled coils 12. The separated solvent is cooled in a cooler 25 and goes into a storage tank 26. The pump 27 conveys it from storage to the top of the scrubber 11 through a line 28, or directly into the cone-bottom 16 of the reactor 6 through a line 29. Instead of pentanes, other solvents for polymers of suitable boiling range can be employed, such as benzene, carbon tetrachloride, chloroform, dichlorethane, etc.

The mixture of polymers, separated in the fractionator 22, goes from the fractionator to storage through a line 30.

Boron fluoride taken from the top of the separator 13 may be returned to the reaction zone by means of the blower 8, either directly through a line 31, or by way of a purifier 32 and lines 33 and 34. Impurities may be drawn off through valved line 35.

It may at times be useful to shorten the delay or induction period preceding the polymerization by introducing a trace of boron fluoride into the liquid stream of iso-butylene at a point ahead of the reactor. Usually the propane issuing from the separator 13 contains traces of boron fluoride, which materially reduces the induction period. The contamination of the cooling agent with the catalyst may even be large enough to necessitate placing the mixing T 3 past the chilled coils 2 rather than ahead of it, as shown in the drawings, in order to avoid excessive prepolymerization in the coils and plugging of the spray device.

If polymerization is to be carried out by spraying polymerizable olefines against a cold surface in the absence of a cooling agent, the wall of the reaction vessel 6 may be chilled from the outside, for instance, by providing a jacket and evaporating therein a suitable refrigerant. A quantity of solvent for polymers may be added to the olefines, provided this does not interfere with the formation of the desired rubbery, elastic polymers, said quantity being large enough to keep the product of polymerization in sufficiently liquid state to allow its flowing down the wall. The scrubber 11 may in this case be eliminated since there are very small quantities of ascending vapors capable of carrying unreacted olefines and the probability of clogging the vapor exit line is very small.

When polymerizing gaseous iso-olefines, a reactor arranged as shown in Figure 2 may be used. Boron fluoride and iso-olefines are introduced through lines 44 and 45, respectively, into the lower part of a reactor 43, in such a manner that substantially instantaneous mixing in the reactor takes place. Cooling liquid is sprayed through a line 38 and an atomizer 39 into the upper part of the reactor 43. The spray of cooling liquid descends in countercurrent to the rising mixture of olefine and boron fluoride gases. As polymerization occurs, cooling liquid evaporates and rises while non-vaporous polymers fall downward into a pool 40 consisting of pentanes or the like in the bottom of the reactor 43. Vapors consisting of cooling agent, unreacted iso-olefines and boron fluoride are withdrawn through reflux line 41 and are scrubbed in scrubber 42 by the descending pentanes.

The pressure in the reaction vessel may be varied to suit conditions, higher pressure accelerating the polymerization and raising the boiling range of a given cooling agent.

While the type of apparatus described is particularly suited for the polymerization of liquids and gases in the presence of gaseous catalysts, it shall be understood that other types of apparatus applicable to the use of liquid and solid catalysts can be designed. We do not intend to limit our invention to any particular apparatus, the only limitations of our invention being those disclosed in the following claims.

We claim as our invention:

1. In the process of polymerizing tertiary base olefines of less than 9 carbon atoms by treating same with an active fluoride to produce rubber-like polymers, the improvement comprising forming a liquid solution of the olefines in an inert lower-boiling liquid hydrocarbon solvent for the olefines, the solvent having a boiling temperature at the operating pressure of the polymerization zone which substantially corresponds to the desired treating temperature and is below the boiling temperature of the olefines, injecting the solution in a state of fine division into the reaction zone containing a gaseous catalyst of the group consisting of boron fluoride and hydrogen fluoride, to effect polymerization of the olefines, whereby heat is liberated and the liquid solvent is vaporized, and maintaining an excess of the liquid solvent in the solution entering the polymerization zone over the quantity of the solvent which is evaporated due to the heat of reaction.

2. The process of claim 1 in which the olefines are substantially in the liquid state during polymerization.

3. The process of claim 1 in which the surface of the reaction zone is continually washed with an organic liquid having a greater wetting power for the surface than the products of the polymerization.

4. The process of claim 1 in which the surface of the reaction zone is continually washed with a lower ketone of the type of acetone.

5. The process of claim 1 in which the surface of the reaction zone is continually washed with a solvent for the products of the polymerization.

MARTIN de SIMÓ.
FREDERICK B. HILMER.